United States Patent [19]
North et al.

[11] Patent Number: 5,174,470
[45] Date of Patent: Dec. 29, 1992

[54] FRIED PRODUCT DISPENSING APPARATUS

[75] Inventors: Larry L. North, Lubbock, Tex.; Simon Sevgian, Scarborough; Derek Chan, Markham, both of Canada

[73] Assignee: Mr. Crispy's Corp., Concord, Canada

[21] Appl. No.: 872,006

[22] Filed: Apr. 22, 1992

[30] Foreign Application Priority Data

Apr. 16, 1992 [CA] Canada .................................. 2,066,294

[51] Int. Cl.$^5$ .............................................. A24F 27/14
[52] U.S. Cl. .............................. 221/150 HC; 99/357; 99/407
[58] Field of Search ..................... 221/150 HC, 150 A; 99/357, 355, 403, 404, 407

[56] References Cited

U.S. PATENT DOCUMENTS

| | | | |
|---|---|---|---|
| 3,685,432 | 8/1972 | Hoeberigs | 221/150 HC |
| 3,690,247 | 9/1972 | Cleven et al. | 221/150 HC |
| 3,870,193 | 3/1975 | Schneider | 221/150 HC |

FOREIGN PATENT DOCUMENTS 955766 10/1974 Canada .
2127031 11/1991 Japan .

OTHER PUBLICATIONS

Canadian Vending Magazine, Sep./Oct. 1989.
Mr. Crispy's Catalogue, published circa Oct. 1990.

Primary Examiner—D. Glenn Dayoan
Assistant Examiner—Kenneth Noland
Attorney, Agent, or Firm—Riches, McKenzie & Herbert

[57] ABSTRACT

An improved french fried product dispensing apparatus is provided comprising a frying bath, a food hopper located above and to one side of the bath, a frying basket movable from an upright position in the frying bath to an least partially inverted position outside the bath, a device for effecting such a movement, a device for ejecting a portion of the food from the hopper into the basket when the basket is in a position between its upright position and its at least partially inverted position, the food hopper having a mechanical impeller therein to prevent bridging of food in the hopper, the hopper enclosed within a refrigerated sub-housing and providing an enclosure for insulating and refrigerating portions of food when removed from the hopper and maintained in the device for ejecting a portion of the food.

13 Claims, 9 Drawing Sheets

FRIED PRODUCT DISPENSING APPARATUS

SCOPE OF THE INVENTION

This invention relates to food dispensing apparatus and, more particularly, for an automated machine for dispensing fixed portions of french fried potatoes.

BACKGROUND OF THE INVENTION

Previously known devices have been proposed for dispensing of portions of fried potatoes Such devices have suffered a number of disadvantages including disadvantages relating to retaining product before it is to be cooked in a sanitary frozen or refrigerated condition, jamming of food delivery systems caused by the bridging of uncooked cut potatoes over the dispensing outlet, accurate control of the portions dispensed, provision of an adequate system for filtering the frying oil and maintaining the frying oil in a clean state with small food particles removed therefrom, simplified and adequate dispensation of condiments and providing for consistent dropping and location of containers to receive the fried product.

SUMMARY OF THE INVENTION

Accordingly, it is an object of the present invention to at least partially overcome these disadvantages of previously known devices and provide an improved food dispensing apparatus In accordance with one aspect of the present invention, there is provided a fried product dispensing apparatus comprising a frying bath, a food hopper located above and to one side of the bath, a frying basket movable from an upright position in the frying bath to an at least partially inverted position outside the bath, means for effecting such a movement, means for ejecting a portion of food from the hopper into the basket when the basket is in a position between its upright position and its at least partially inverted position, the improvement characterized by enclosing the food hopper within a refrigerated sub-housing and providing means for insulating and refrigerating portions of food when removed from the hopper and maintained in the means for ejecting a portion of the food.

In a further aspect the invention provides an apparatus for storing particulate food product in a refridgerated condition, then frying and dispensing portions of the product, comprising enclosed within a housing a frying bath, a hopper for storage of said product located above and to one side of the bath, said hopper being enclosed in a refridgerated, insulated sub-housing, said hopper having a discharge opening through a bottom wall of said sub-housing, said hopper including impeller means disposed on an interior surface thereof adjacent said discharge opening for rotating movement to maintain even flow of said product through said discharge opening, a frying basket movable between an upright position in the frying bath and an least partially inverted position outside the bath means for delivery of a portion of said product from the hopper into the frying basket when said frying basket is positioned intermediate the position in the frying bath and the partially inverted position, said means for delivery comprising, a slider-receiving member disposed immediately below said sub-housing with a substantially horizontal slideway defined therein having a bottom wall, opposed side walls and a top wall, said top wall having an opening therethrough below and in communication with said discharge opening, a slide member slidably received in the slideway for sliding therein between a retracted storage position and an extended dispensing position, the slide member having a vertical opening therethrough defining a portioning cavity therein, in said retracted position said portioning cavity disposed immediately below the opening in said top wall of the slider-receiving-member in communication therewith so as to receive product from the hopper, in the extended position, said vertical opening through the slider disposed entirely beyond the guideway to permit said product to be dispensed vertically downward therefrom into the basket, when the slide member is in said retracted position, the portioning cavity is completely encircled by insulated wall portions of the slide member or the slider-receiving-member to thermally insulate the portioning cavity from interior portions of the housing, means for effecting movement of the basket from its upright position to its at least partially invented position including means for effecting rotation of the basket about an axis in a direction to cause partial inversion of the basket after a predetermined frying time.

In another aspect, the invention provides an apparatus for dispensing fried edible product utilizing an advantageous fine mesh basket for retaining small food particles with the food product to be dispensed. Such a basket advantageously permits the apparatus to be operated without the need for continuous filtration of the frying oil and such that merely a simplified manual system for periodic filtration of the cooking oil may be utilized.

In another aspect this invention resides in providing a fried product dispensing apparatus having a simplified condiment dispenser disposed in a food access cavity of the cabinet of the apparatus, the condiment dispenser accessible only at the time of or immediately following dispensation of the cooked food product to the consumer.

In a further aspect, this invention resides in providing a fried product dispensing apparatus providing an improved air filtration unit for removing odours from and purify air drawn from both within and surrounding the fried product dispensing apparatus.

In another aspect, the present invention provides an improved cup guiding chute mechanism for providing for consistent guiding of a vertically dropping cup so as to slide along an inclined chute.

BRIEF DESCRIPTION OF THE DRAWINGS

Further advantages and objects of the present invention will appear from the following description taken together with accompanying drawings in which.

DETAILED DESCRIPTION OF THE DRAWINGS

Figure 1:
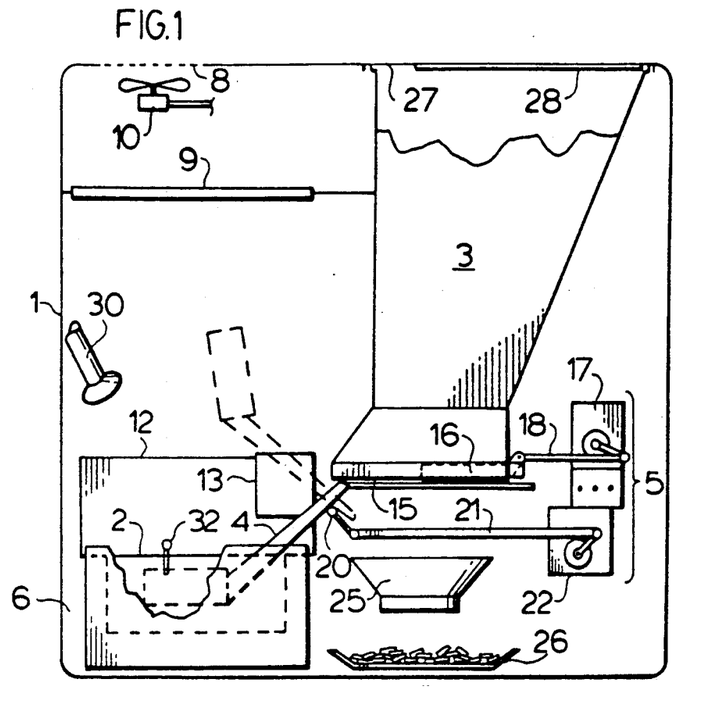
FIG. 1 is a cutaway front view of a fried product dispenser according to a first embodiment of the invention.

Referring to FIG. 1, the apparatus of the first embodiment consists basically of a stainless steel casing 1 housing a stainless steel frying bath 2, food hopper 3, pivotally mounted frying basket and chute 4 and motor and control devices indicated generally at 5.

The sides and base of the frying bath are surrounded by a layer of heat insulating material 6, and fumes rising from the bath, may escape from housing 1 via a grill 8 set in the top. The fumes are extracted by means of a fan 10 and via a replaceable charcoal filter unit 9. An automatic fire extinguisher 30 is mounted on one side of the fume outlet channel, to extinguish the frying oil if it should catch fire Above and behind the frying bath 2 is situated a frying oil reservoir tank 12 which is fitted with an oil circulating pump 13 and an oil filter (not shown) The reservoir tank is provided with a conventional drip feed 32 to the bath 2.

Below the outlet of hopper 3 is located base plate 15. Sliding on plate 15 is a slide 16, movement of which is controlled by a motor 17 via a linkage 18 as shown. When motor 17 is energized, the slide 16 is reciprocated, to push the products at the base of the hopper sideways and into chute and basket 4. Set in the base of hopper 3 but not shown is an agitator to ensure correct feed of material from the hopper into slide 16.

Chute and basket 4 can pivot about horizontal axis 20 from the position shown in full lines (in which the basket is immersed in frying oil) to that shown in dotted lines, by means of a linkage 21 and motor 22. Below the lower outer end of the chute in the position shown in dotted lines is a guide funnel 25, below which a plate 26 may be placed to receive the fried products The hopper 3 may be filled by raising a hinged lid 27. The inside of lid 27 bears a mirror 28 to enable the user easily to see how full hopper 3 is.

Attached to motor 17 is a counter which is actuated by passage over it of link arm 18 to count the number of portions of fried product are dispensed.

The casing 1 is normally closed on its front face by a pair of side-hung casement doors, the base of the right hand door being cut away to allow insertion and removal of a plate below funnel 25.

As noted above, the apparatus may be operated either by manual command or by means of a coin-release system of known type. Indicator lights may be provided in known fashion to indicate conditions of the apparatus such as "ready to use", "frying" and "empty".

In use, hopper 3 is charged with the product to be fried and the frying bath and oil reservoir with oil.

Motor 17 energized to push, by means of slide 16, the required quantity of food product onto the chute, and so into the frying basket 4, which is immersed in the frying bath At this stage, the food produce starts to fry and, after a predetermined time interval, motor 22 is energized, first to lift the basket and food out of the oil, and so allow excess oil to drain off, and thereafter to raise the basket to the position shown in dotted lines whereupon the food slides down the chute and onto the waiting plate 26. The basket then returns to the position shown in full lines and the apparatus is ready for a further cycle.

Figure 2:
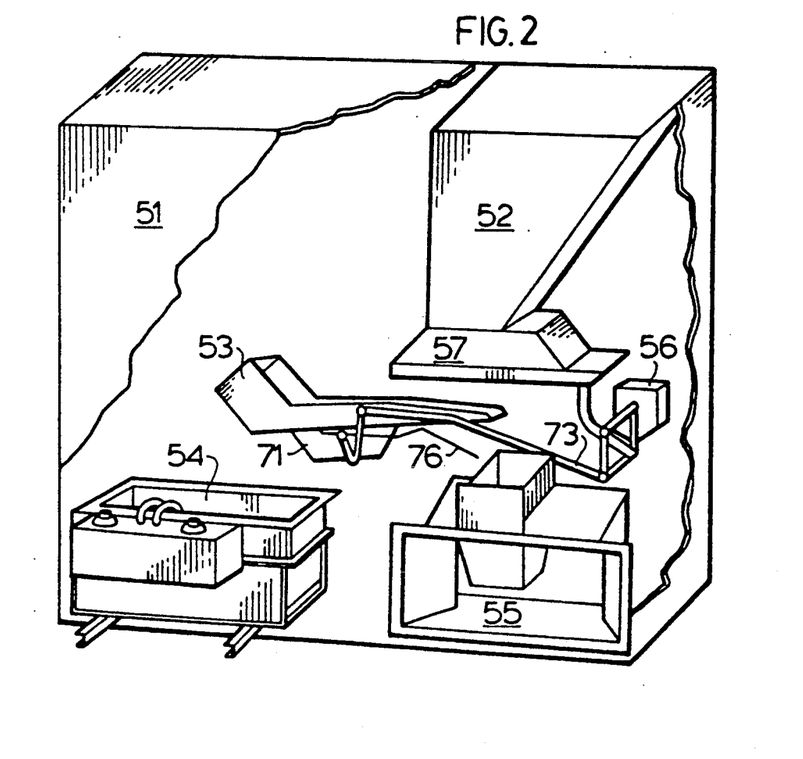
FIG. 2 is a perspective cutaway front view of a second embodiment of a fried product dispenser according to the invention.
Figure 3:
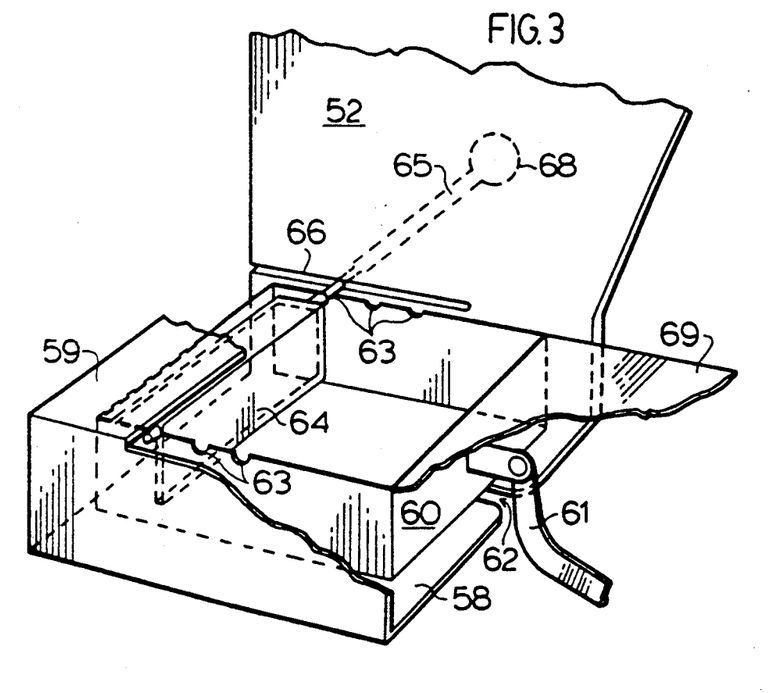
FIG. 3 is a detailed view of the portion dispenser mechanism of the dispenser of FIG. 2.
Figure 4:
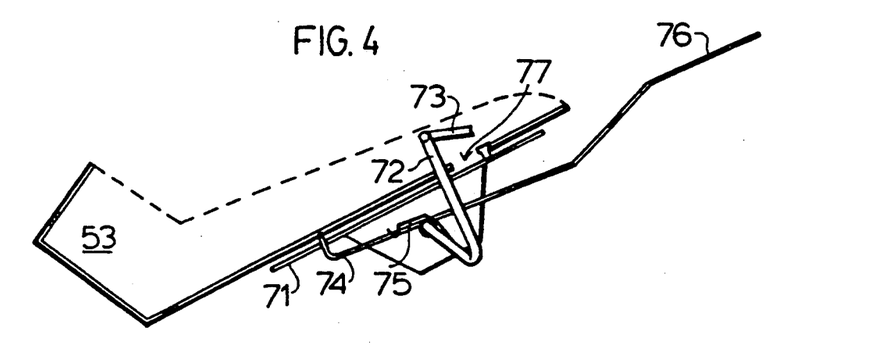
FIG. 4 is a detailed view of the frying basket used in the dispenser of FIG. 2.

Referring to FIGS. 2-4, there is shown a second embodiment of the dispenser according to this invention. This dispenser comprises a casing 51 housing the basic components, hopper 52, basket and chute 53, frying bath 54, outlet guide and plate holder 55, and motor 56. At the base of the hopper 52 is a portion dispenser mechanism 57, which is shown in more detail in FIG. 3. The base of the hopper is formed into a rectangular section tunnel 58 having its roof cut away to allow access of material from the hopper into the tunnel 58, leaving only a roof portion 59 left. Along this tunnel there is slidable back and forth a rectangular member 60, operated by an arm 61 attached to the centre of one short side of the rectangle, and which slides, in use, in a slot 62 in the floor of tunnel 58 Supported between the long side of rectangular pusher member 60, and resting in one pair of slots 63, is a pivotally mounted angled plate 64. Attached to plate 64 is an arm 65 bearing at its end a weight 68 as shown. A slot 66 is provided in the far wall of the hopper to enable the assembly of pusher member 60 and angled plate 64 to move.

In use, in the position shown, food to be dispensed falls into the tunnel, the exact amount being determined by which pair of slots 63 the angled plate 64 is resting in. In order to dispense the food, pusher member 61 is moved to the left as shown. This pushes angled plate 64 out from under roof portion 59 and this plate, under the influence of weight 65, rotates to allow the food to be pushed freely leftwards and into the chute of a waiting basket 53. The ingress of more food behind the pusher member 60 is prevented by a plate 69.

This movement is effected by motor 56, which via the linkage shown rocks basket 53 to lower the food product gently onto the frying liquid in bath 54. The motor then stops under the action of a suitable cam and microswitch arrangement.

After a predetermined time, motor 56 is again driven the output shaft moving further clockwise as shown in FIG. 2. This retracts pusher 60 into tunnel 58 to prepare for the next portion, and in so doing, roof portion 59 causes angled plate 64 to rotate to the position shown in FIG. 2 to form, again, the correctly sized tunnel portion Meanwhile, basket 53 is slowly removed from the frying liquid in bath 54 and inverted, the upper end of the chute coming over the aperture in outlet guide 55.

As is shown more clearly in FIG. 4, basket 53 is slidably mounted with respect to a plate 71, which is fixed to a pivoted arm 72 which is rotated by the motor 56 via linkage arm 73. Sliding of basket 53 on plate 71 is prevented by the engagement of a spring loaded pin 74 in two registered apertures—one in plate 71 and the other basket 53. Pin 74 is biased by spring 75. However, as the basket and plate are rotated, the end 76 of pin 74 remote from the registered apertures abuts the top of guide 55 and as the assembly is rotated further, pin 74 is removed from the aperture in basket 53. No longer held, this basket slides sharply under the influence of gravity down plate 71 till it reaches the end of its travel, defined by a slot 77 in its base when it stops abruptly, and the fried product therein is ejected smartly onto a plate placed in guide 55. The motor 56 continues to be driven until the apparatus reaches the rest position, as shown in FIG. 2, at which it stops (again by cam and microswitch means not shown), ready for the next frying and dispensing cycle.

Reference is now made to FIGS. 5 to 16 showing a third embodiment similar in most respects to the second embodiment. In the third embodiment of FIGS. 5 to 16, similar reference numerals are used to those in FIGS. 2 to 4 to indicate similar elements.

Figure 5:
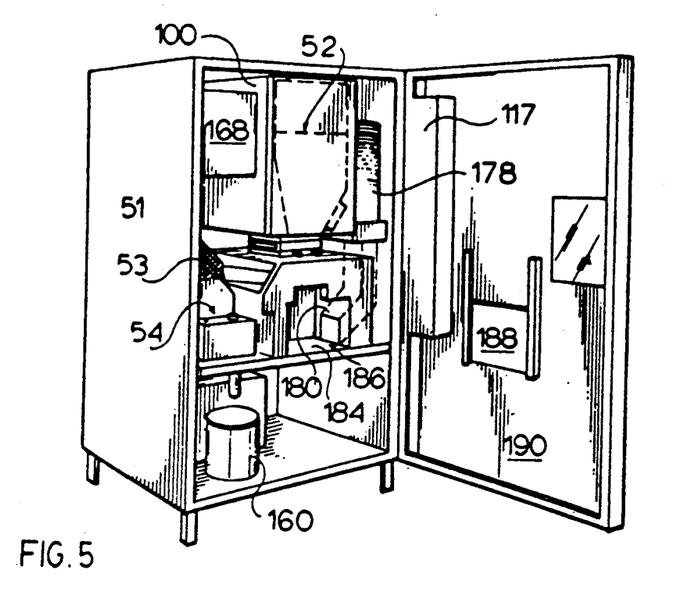
FIG. 5 is a perspective view of a fried product dispenser in accordance with a third embodiment of the present invention.

The dispenser of FIG. 5 comprises a casing 51 housing basic components including hopper 52, basket and chute 53 and fry basket 54.

Hopper 52 is enclosed within an insulated and refrigerated sub-housing 100 having a front door which is hinged at the vertical right hand side of the sub-housing 100 to permit easy access to the hopper. A suitable cooling system (not shown) is provided to control the temperature in the sub-housing 100 in a well-known manner as with cooling coils disposed within the refrigerated sub-housing 100 and a suitable known thermostat control.

Figure 7:
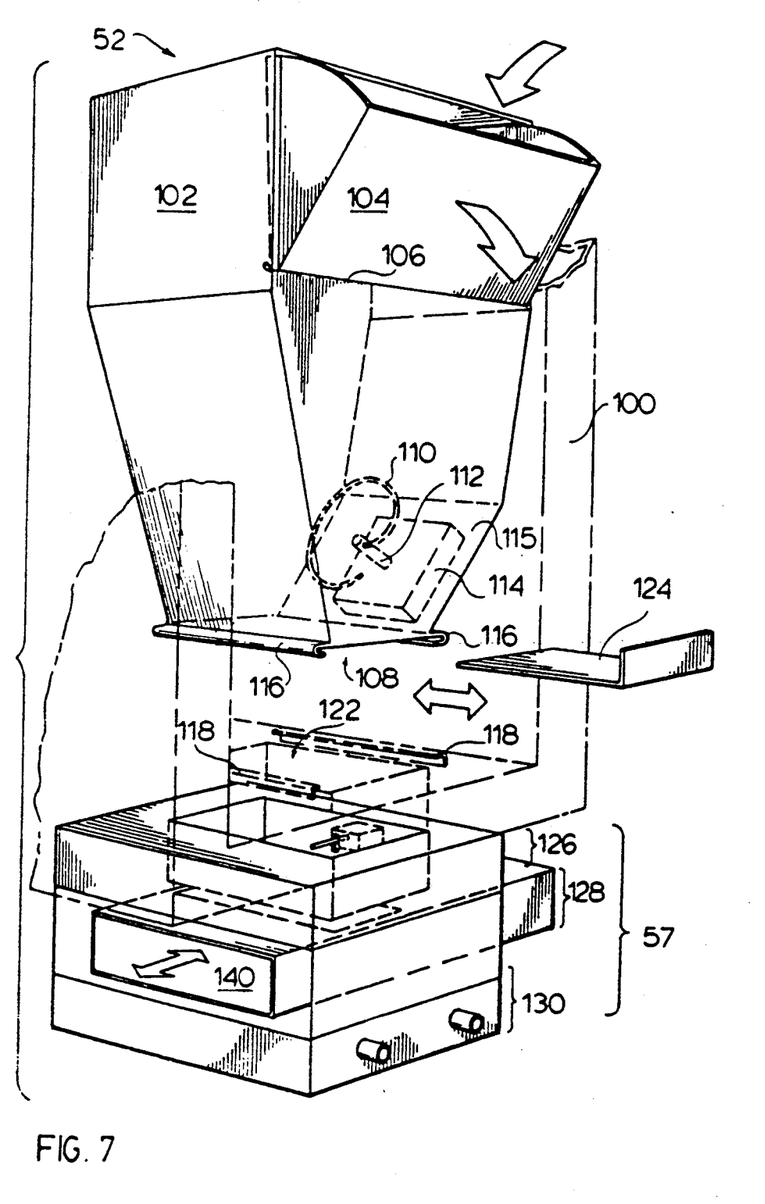
FIG. 7 is an exploded view of FIG. 5 showing the portion dispensing mechanism and the hopper.

As seen in FIG. 7, the hopper has an upper rectangular portion 102 having a chute door 104 hinged along a horizontal axis 106 for pivoting forwardly and downwardly to permit easy addition of frozen or refrigerated product such as french fried potatoes into the hopper from the front when the housing is opened. The hopper tapers downwardly to a rectangular open bottom 108. An agitator is provided in the hopper comprising a rigid part-helix-like impeller 110 mounted for rotation by shaft 112. Shaft 112 is driven by a motor located in housing 114 secured to the exterior of a lower angled surface 115 of the hopper. Impeller 110 is driven periodically at low speeds so as to prevent bridging of the food product against the lower angled surface 115 and ensure its even flow through bottom opening 108. A rotatably driven impeller 110 is preferably selected in the dispensation of elongated food product over other agitators, such as vibrators, as the stirring action achieved reduces the amount of food product which is longitudinally oriented in a horizontal direction. Preferably, the impeller 110 is controlled by a microprocessor control system 117 located in the casing 51 or alternately secured to the door 190, thereby providing control of the operation of all systems.

Hopper 52 is slidably received in the refrigerated sub-housing 100 by slide guides 116 on the hopper being received in slide tracks 118 secured to the inner lower surface of sub-housing 100 about an exit opening 122 in the housing Hopper 52 is thus removable for substitution and cleaning by sliding forwardly. To avoid the need to empty the hopper 52 for removal, a blocking plate 124 is provided slidable in slots in slide guide 116 to temporarily close off the hopper's exit opening 122.

For normal operation of the apparatus, plate 124 is removed.

As best seen in FIG. 7, a portion dispensing mechanism 57 is secured immediately under the refrigerated housing 100. Mechanism 57 has an upper box-forming portion 126, a middle slider receiving portion 128 and a bottom cooling portion 130.

The upper box-forming portion 126 has a rectangular central cavity 132 with an upper opening 134 corresponding in size to the open bottom 108 of the hopper 52 as well as to the exit opening 122 of the refrigerated sub-housing 100.

The slider-receiving portion 128 has a horizontal slideway 142 defined therein. The slideway 142 has a rectangular cross-section as seen in end view and is sized to slidably receive therein portioning slider 140. The slideway 142 extends horizontally entirely through the portion 128. The slideway has a continuous bottom wall 163 upon which the slider 140 is slidable. A top wall to the slideway has an opening 136 therethrough. Opening 136 is below and in communication with hopper 52 via upper opening 134 and exit opening 122 The side walls 143 of the slideway are relatively thick and insulated.

Positioning slider 140 has a rectangular opening 145 vertically therethrough which defines a portioning cavity 144 in slider 140. Slider 140 is shown with thin side walls 147 on either side of cavity 144 and relatively thick, insulated walls 151 on either end of cavity 144.

In use, slider 140 is first positioned in a retracted feed and storage position as seen in FIG. 7 with its cavity 144 aligned below opening 136 Agitator impeller 110 is rotated to cause product in hopper 52 to drop down and fill cavities 132 and 144. As a next step, slider 140 is slid to the fully extended dispensing position shown in FIG. 8, carrying the portion of the product in its positioning cavity 144. The product, on movement of the slider so that its opening 145 is beyond front wall 146, drops downward through opening 145 and onto the basket and chute 53.

Figures 8, 9:
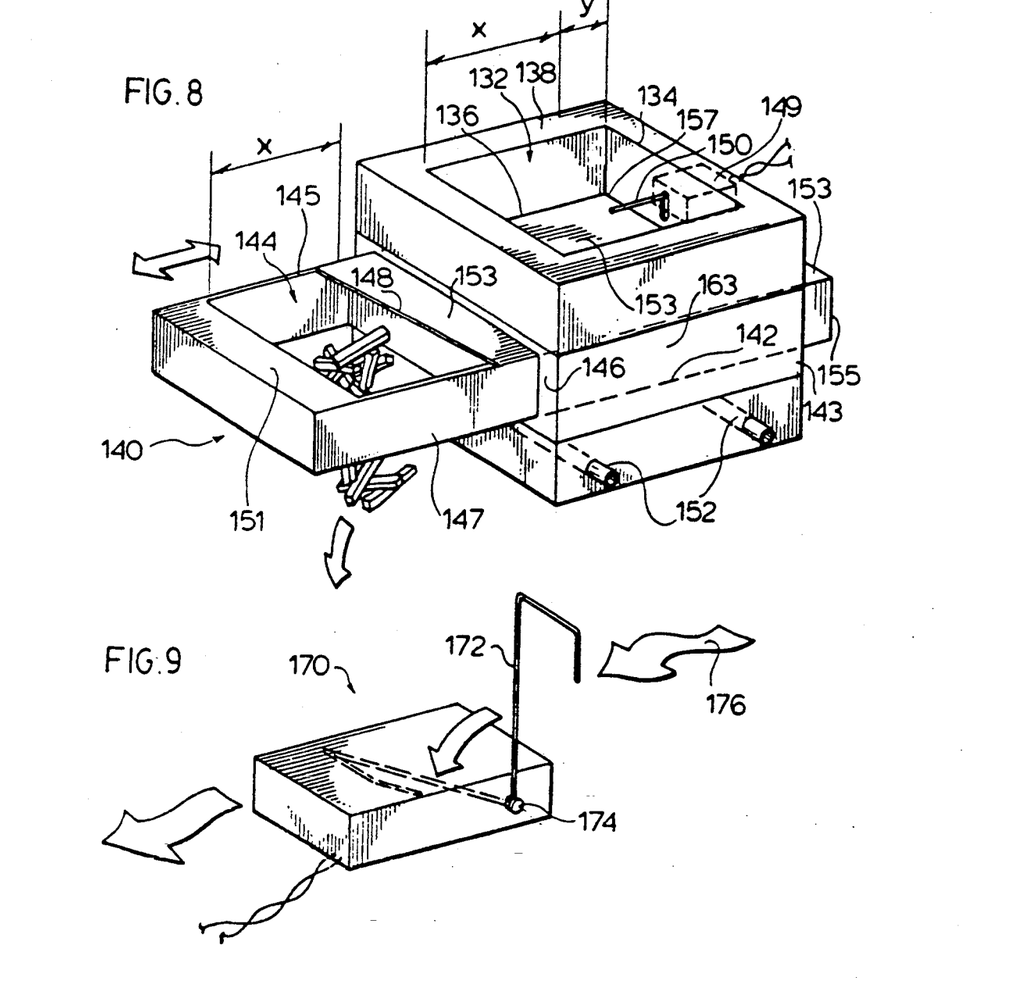
FIG. 8 is an enlarged view of the portion dispensing mechanism of FIG. 5.
FIG. 9 is a pictorial view of an advantageous air flow indicating gauge for use with the embodiment of FIG. 5.

Slider 140 is provided with an angled knife member 148 at the top rear thereof so as, on sliding of the slider 140 to the left, to cut any product in a guillotine-like fashion which may extend up from cavity 144 into cavity 132. The slider 140 has a continuous top plate 153 which extends rearward of knife member 148 so that when the slider 140 is slid forwardly, plate 153 blocks further product from dropping out of cavity 132.

The slider is preferably of sufficient length such that when fully extended as seen in FIG. 8, its rear end 155 remains rearward of the rearmost part of opening 136. Openings 145 and 136 are preferably of the same width but of different lengths with cavity 144 having a shorter length x in the direction of sliding than opening 132 which has a length x+y as shown.

A weight sensitive switch 149 is provided in cavity 132 with an arm 150 biased upwardly. If no product rests on arm 149, the switch is opened sending an electronic signal to the microprocessor control to indicate no product remains in the hopper. On the signal being received, the impeller 110 may be rotated for a period of time and then if the weight sensitive switch 149 remains closed, the microprocessor may indicate the machine is empty. Switch arm 150 is located in cavity 132 above top plate 153 when the slider is in the feed and storage position of FIG. 7.

A preferred cyclical movement of slider 140 is as follows.

From the retracted feed and storage position shown in FIG. 7 and in which cavity 144 aligns with cavity 132, the slider 140 filled with product moves forwardly to the fully extended position of FIG. 8 to dispense product. The slider is then moved rearwardly beyond the retracted feed and storage position to a fully retracted position in which the knife edge 148 of top plate 153 is slightly rearward of the rear edge 157 of opening 136. Next, the slider 140 is moved forwardly to the retracted feed and storage position of FIG. 7. This movement rearward beyond the retracted feed and storage position is advantageous to push product off the top of top plate 153 and assists in further agitation of the product as assists in its feeding into cavity 144.

Bottom cooling portion 130 comprises an insulated bottom cap which includes a single loop of refrigerated cooling coil 152. The cooling coil 152 is shown schematically merely as two tubes which extend from a forward side of the bottom cooling portion. In practice, the cooling tubes are provided to extend from the rear and are to be coupled to the same refrigerated cooling system which cools refrigerated sub-housing 100. Each of the upper box-forming portion, middle-slider-receiving portion and bottom cooling portion are provided with relatively thick side walls which, while not shown, contain insulation. Similarly, slider 140 has relatively thick, insulated side walls forward and rear of cavity 144. When slider 140 is in the retracted position as in FIG. 7, insulated side walls on either side of the slideway in slider-receiving-portion 128 and the insulated side walls of the slider 40 serve to isolate and insulate product in the portioning cavity. With the bottom portion insulated and the upper box-forming portion having all four of its side walls insulated, the portion dispensing mechanism, in effect, isolates and insulates product therein from the remainder of the interior of housing 51 other than, of course, sub-housing 100. Thus, product which may be disposed in cavity 132 and cavity 144, when the slider 140 is in a closed position, is maintained isolated and insulated from other than the inside of sub-housing 100 and in a refrigerated controlled temperature condition. This is advantageous in ensuring that the product which may stand in the cavity 132 and/or cavity 144 for a period of time, remains refrigerated or partially frozen against spoiling.

Figure 6:
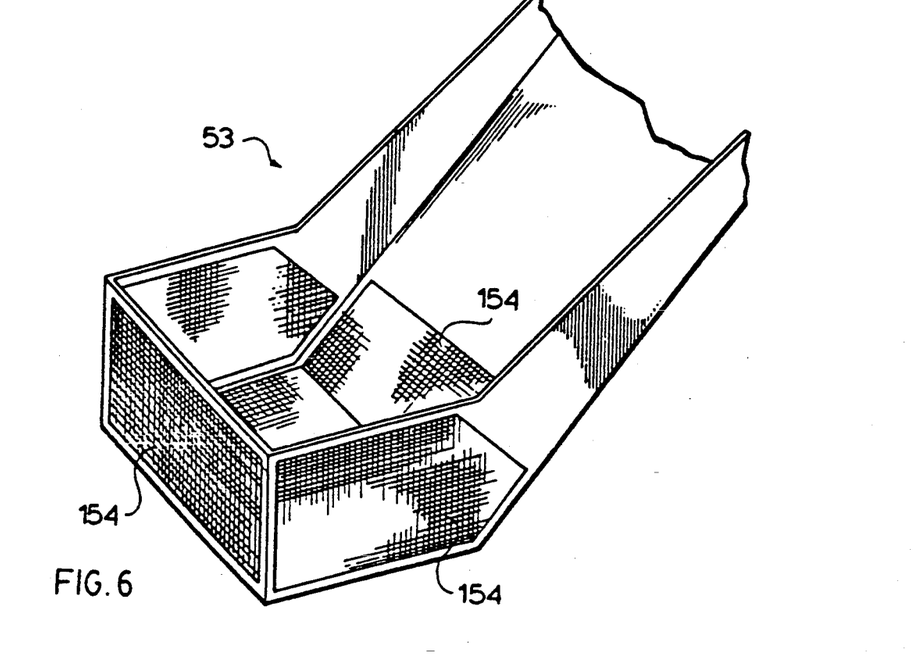
FIG. 6 is an enlarged view of the basket and chute of FIG. 5.

Reference is now made to FIG. 6 which shows a basket and chute 56 in accordance with the third embodiment. The basket 53 is formed from stainless steel sheet metal with openings in each of the front, side, bottom and chute walls covered by wire mesh 154. The wire mesh is chosen to have sufficiently small openings therethrough to retain in the basket small particles of the product. Preferably, the wire mesh is in the range of 40 to 120 mesh and, more preferably, about 80 mesh. Conventional oil frying systems use straining baskets with much larger openings so as to have small particles of the food pass from the product into the oil bath so that these particles may then be automatically filtered from the oil bath. In accordance with the third embodiment, no automated filtration system is provided for continuous filtration. Surprisingly, it has been found advantageous to operation of the apparatus to maintain small particles of product with the product so that they may be dispensed to a customer with the product and thereby removed from the oil system. The life and quality of the frying oil is thereby extended.

Figure 12:
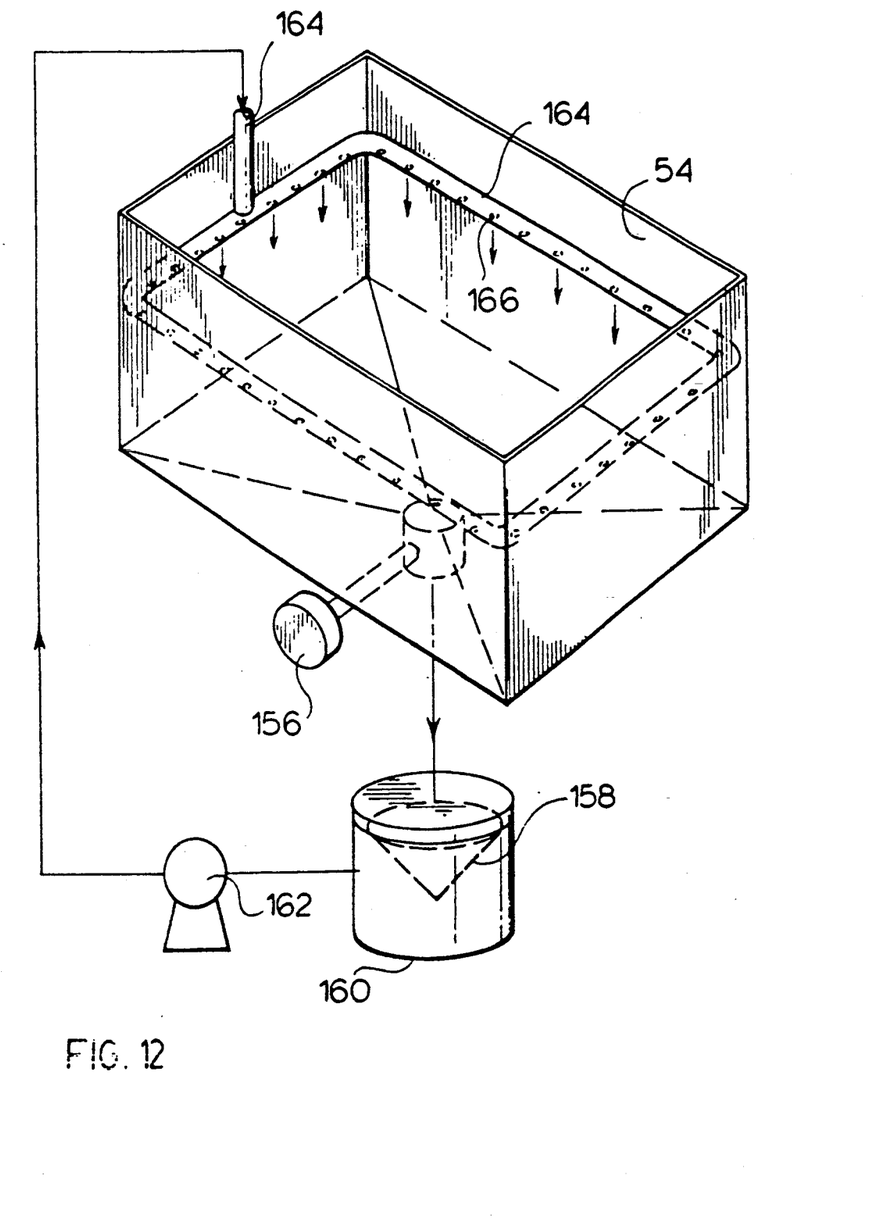
FIG. 12 is a schematic view of the frying bath and oil filter system for use with the third embodiment of FIG. 5.

Reference is now made to FIG. 12 showing a schematic view of the frying bath 54 and an oil filtration and circulation system in accordance with the third embodiment. The frying bath 54 comprises a stainless steel box which has a manually operable draining valve 156 in its bottom surface. While not shown in FIG. 12, the frying bath 54 would have heating coils disposed therein to maintain the oil in a thermostatically controlled temperature during use. Draining valve 156 permits manual draining of oil through a paper filter cone 158 into a oil reservoir 160 from which it may be pumped via a pump 162 to a return tube 164 disposed in a ring closely adjacent each interior side wall of the bath 54. Discharge holes 166 in the under surfaces of the tube 164 direct jets of oil downwardly adjacent the interior side surfaces of the frying bath. This is of substantial assistance in dislodging any small particles of product which come to be in the frying bath and typically attach to the side walls of the bath. These jet forming holes 166 in tube 164 substantially assist in flushing particulate matter down the sides of the bath 54 and through manual draining valve 156 to be caught in the filter cone 158.

In accordance with the third embodiment of the invention, a machine may be located at a location for maintenance and servicing approximately every 24 to 48 hours. During automated operation, the oil remains in the frying bath 54 unchanged. Preferably, each time the apparatus is serviced, the frying bath is manually flushed and the oil circulated via the pump 162 so as to remove particulate matter which may come to remain in the frying bath. It has been appreciated by that the presence of small particles of food product in the oil bath over an extended period of time leads to odourization and discolorization of the cooking oil which can be avoided by minimizing through the use of the fine wire mesh 154

Figure 16:
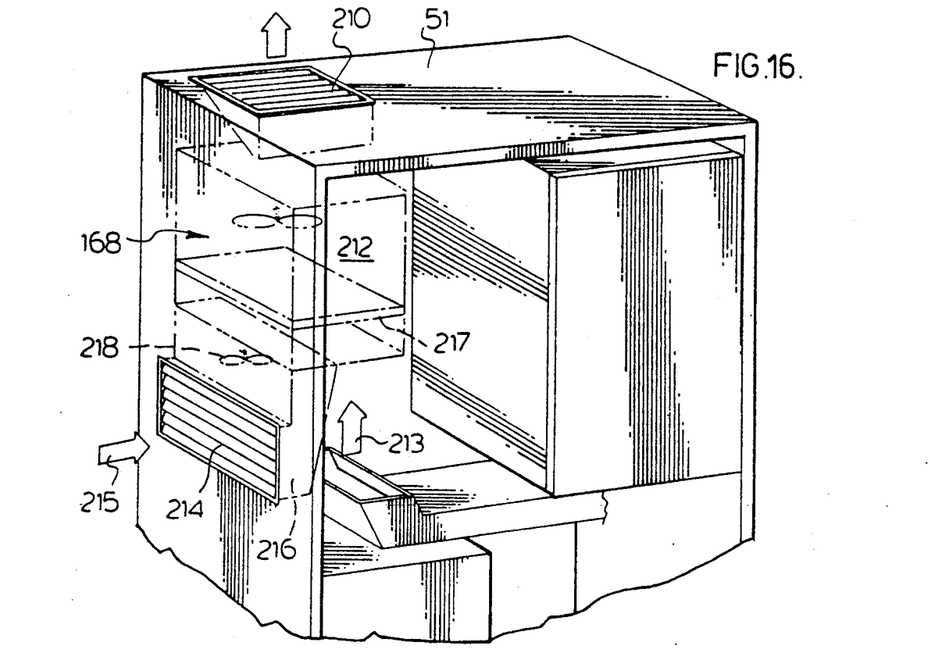
FIG. 16 is a partial schematic pictorial view of the air filtration unit for use with the third embodiment of FIG. 5.

Reference is now made to FIGS. 9 and 16 showing a preferred air flow meter and air filtration unit 168 developed for use with the third embodiment In the third embodiment, an air discharge unit generally indicated 168 is provided in the upper left hand corner of the unit. Air is drawn out from the bottom of the unit 168 to be discharged through vent 210 in the top of the casing 51, preferably with substantial amounts of grease, dust and other odour causing particulate matter and molecules removed. Preferably, the air filtration unit 168 comprises two, three or four different filtering media 217 including, for example, stainless steel baffling, a pleated paper filter, a high efficiency paper filter and then a charcoal filter. A fan (designated by numeral 10 in FIG. 1) may be provided on the exit stream side from the filtering media 217 to draw air through the filter unit 212 and discharge it from the casing 51.

Air flow from within the casing 51 into the unit 168 is indicated generally by the large arrow designated with reference number 213. Preferably, the air discharge unit 168 also draws in air from outside the casing 51 for filtration and purification by the air filter unit 212 In this embodiment, the fried product dispensing apparatus may advantageously be used to assist in maintaining the area in which the dispensing apparatus is located in a more pleasant dust and odour free condition. Air is drawn into the unit 168 via an opening 214 made through the side of the casing 51. Air flow from outside the casing 51 into the unit 168 is indicated generally by the large arrow designated by reference numeral 215. Preferably the opening 214 is in sealed communication with the air filter unit 212 by means of a duct 216, such that there is no intermingling of air which is drawn from the bottom of the unit 168 and air drawn in from outside. Providing sealed communication between the opening 214 and air filter unit 212, further safeguards against untreated air from within the dispensing apparatus escaping, via the opening 214.

A blower fan 218 operated independently of the fan 10, may optimally be provided within duct 216. Blower fan 218 permits filtration of air drawn from outside the casing 51 independently from the filtration of air drawn from the bottom of the unit 168.

The air flow switch indicated in FIG. 9 is to be disposed in the airstream. The air flow gauge generally indicated 170 comprises an inverted, J-shaped rigid piece of wire 172 fixed to pin 174. The pin is spring-biased so as to hold the wire 172 in a vertical position as seen in solid lines in FIG. 9. Air flow as indicated by large arrow 176 urges the wire to rotate with the pin to a position shown in dotted lines in FIG. 9. The movement of the wire to the position shown in dotted lines provides a signal to the microprocessor that air flow through the air filtering unit is satisfactory. Indication of a condition that air flow is not satisfactory can be used as an indicator that the air fan is working improperly or that the filtration unit is clogged. Alternatively use of the wire 172 may be equally advantageous replaced by the use of a vane system as, for example, in which the area defined within the confines of the J is enclosed.

While FIGS. 9 and 16 show a single air filtration unit 168 which may advantageously be used to filter air drawn from both outside and within the casing 51, it is appreciated that while less economical, separate air filtration units may equally be used.

Figure 10:
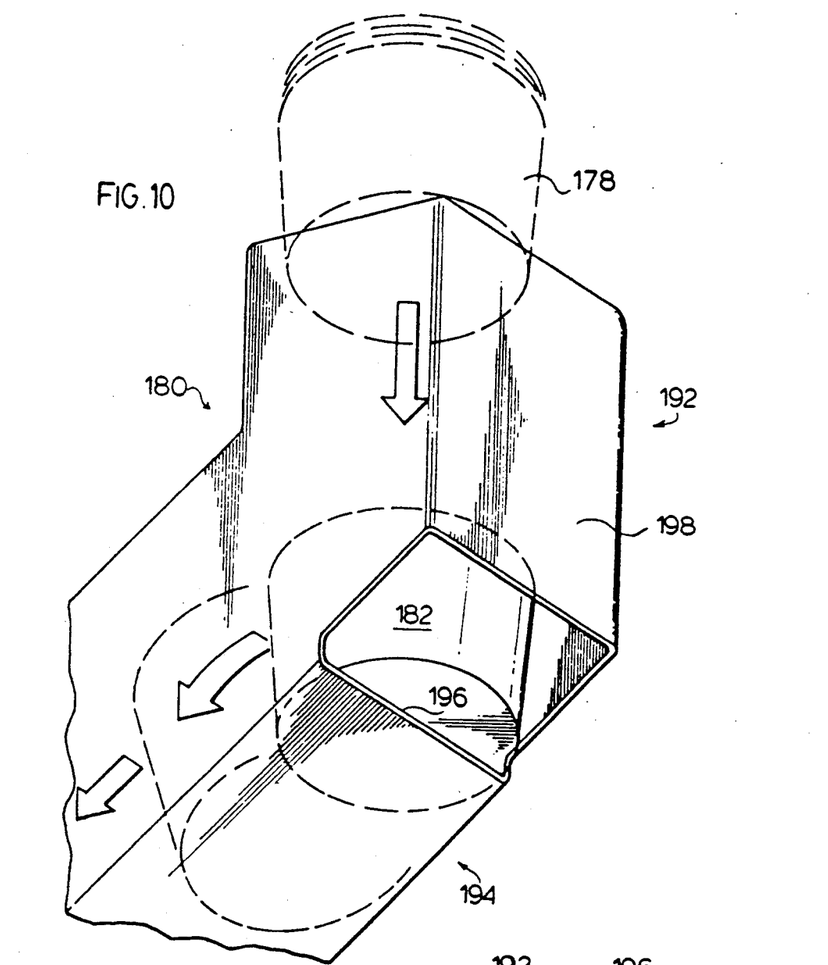
FIG. 10 is a schematic pictorial view of a cup chute for use with the third embodiment of FIG. 5.
Figure 11:
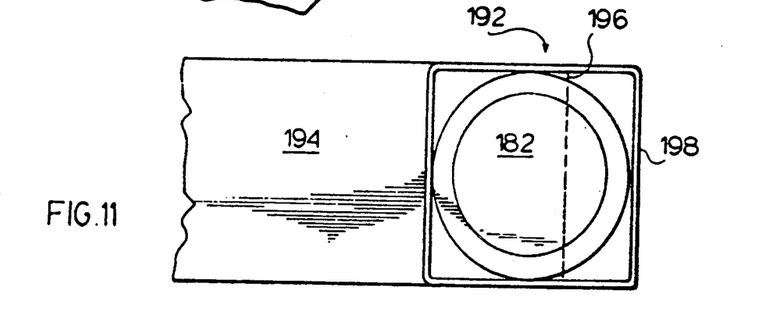
FIG. 11 is a bottom view of FIG. 10.

Reference is now made to FIGS. 10 and 11 which shows a chute for dispensing paper cups. While not clearly shown in FIG. 5, the paper cups are stacked in a vertically-nested pile 178 and a chute shown schematically in dotted lines in FIG. 5 directs a cup 182, on being dispensed vertically by cup dispensing means not shown, to consistently slide down the chute and down onto the floor 184 of the access cavity 186 into which product is dispensed from the basket and chute 53. Access is provided for a user to a cup filled with product via a vertically slidable glass or plastic access door 188 in a hinged front door 190 of the casing 51.

Returning now to FIGS. 10 and 11, the chute 180 has a vertical chute portion of square cross-section 192 and an angled chute-portion 194 of rectangular cross-section. At the lower outer corner of the vertical chute portion, a portion of the lower wall is cut away so as to define a strike edge 196 in the lower wall forming the bottom of the angled chute portion 194. As best seen in FIG. 11, the strike edge 196 is located approximately one-third of the distance from a rear wall 198 when seen in top view. On a cup 182 dropping down the vertical chute portion 192, the cup engages a strike edge 196. By reason of the mass of the centre of the cup residing towards the left of the strike edge 196 as seen in FIG. 11, the cup on impacting the strike edge 196 pivots about the strike edge so that the bottom surface of the cup 182 moves from a horizontal position to adopt an angular position corresponding to the angulation of the bottom surface of the angled chute portion 194. In such position, the cup may then smoothly slide down the angled chute portion 194 and onto floor 184. Use of the strike edge 196 provides for consistent dropping of the cups and sliding down the angled chute portion without jamming.

Figure 13:
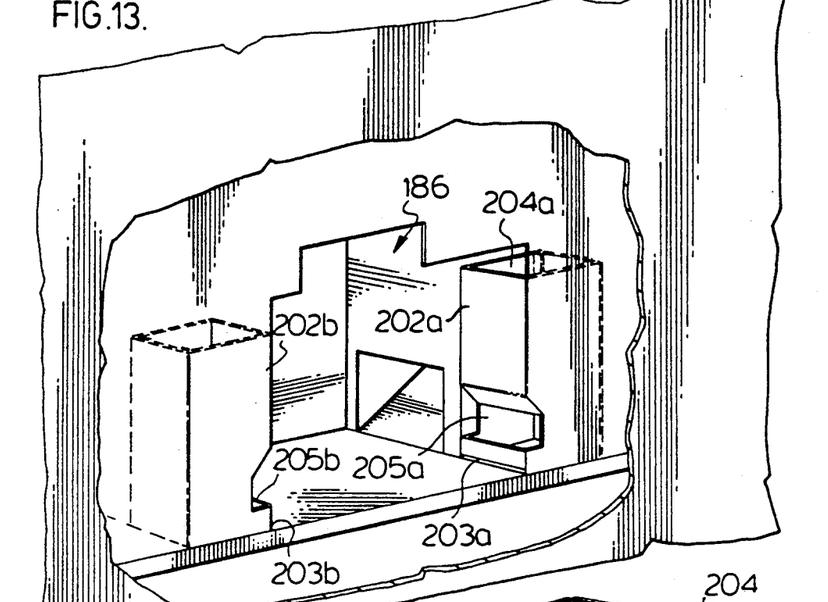
FIG. 13 is a partial schematic pictorial view of the food access cavity for use with the third embodiment of FIG. 5.
Figure 14:
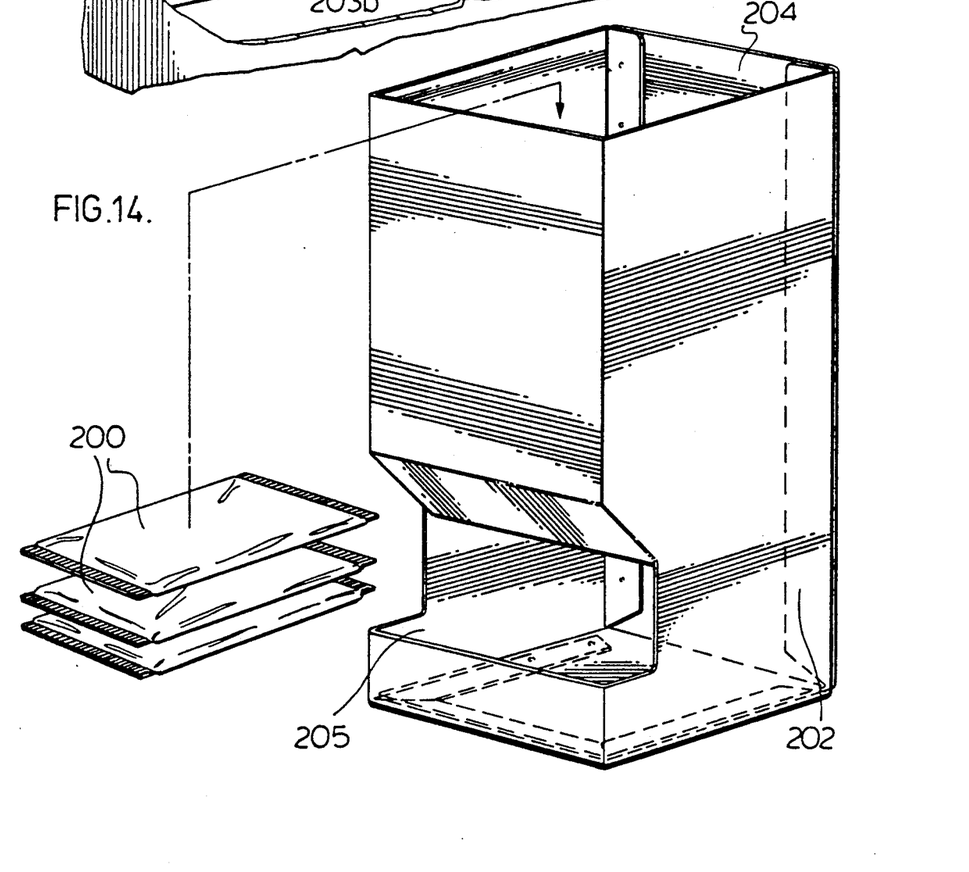
FIG. 14 is an exploded schematic pictorial view of a condiment dispenser for use with the third embodiment of FIG. 5.
Figure 15:
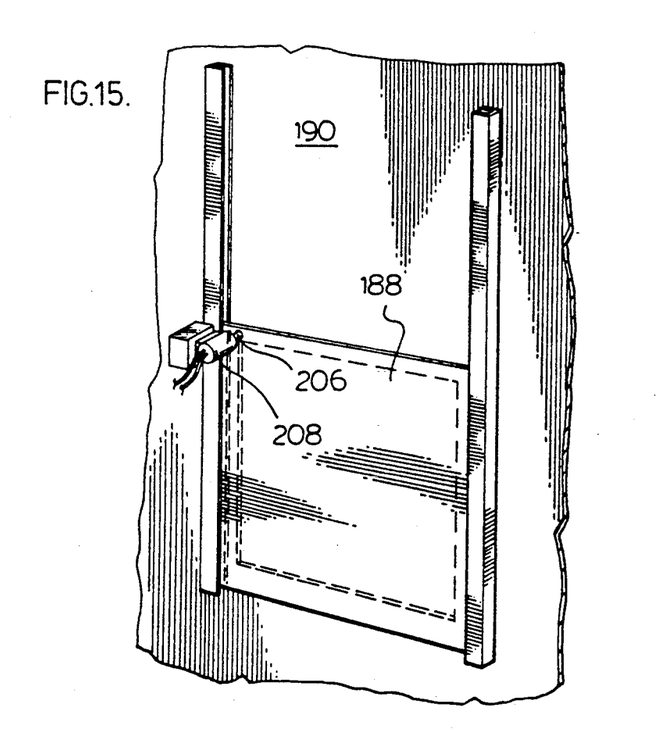
FIG. 15 is a partial rear view of an access door for use with the third embodiment of FIG. 5.

As seen best in FIGS. 13 to 15, the access cavity 186 has located therein condiment packages 200 housed in condiment dispensers 202a,202b. Each condiment dispenser 202 has an upright, generally rectangular box shape, having at an uppermost end a top opening 204 through which the dispenser 202 may be filled A lower opening 205 formed in a side of the dispenser 202 and accessible from the access cavity 186 permits easy removal of the condiment packages 200 via the access cavity 186. The condiment dispenser 202 of the present invention is advantageous in providing inexpensive, simplified construction and flexibility to the user, permitting removal of any desired number of condiment packages 200

The condiment dispensers 202a,202b are positioned in the access chamber 186 to minimize the possibility of tampering. The condiment dispensers 202a,202b are held at lowermost facing edges by flanges 203a,203b and are of sufficient size to engage the side wall of the access chamber 186, such that the dispensers 202a,202b can only be removed from the access chamber 186 by forward sliding when the hinged front door 190 is in an opened position.

Preferably the sliding access door 188 is made lockable in a closed position by a sliding bolt 206 which is biased in the locked position engaging the door 188 by means of a solenoid 208. The solenoid 208 is operable to move to the sliding bolt 206 to an unlocked position for a set period of time upon receipt of a signal from the microprocessor 117. In this manner the door 188 prevents access to the access cavity 186 at all times when the machine is either not in use or under servicing to prevent unauthorized removal of condiment packages 200.

The third embodiment shown in FIGS. 5 to 16 operates in a manner substantially identical to that described with the second embodiment. The specific features described in association with the third embodiment enhance the performance of the apparatus over that described with the second embodiment. In accordance with the third embodiment, a microprocessor control generally indicated 117 may be provided on the inside surfaces of the door 190 for convenient access.

While the invention has been described with reference to preferred embodiments, it is not so limited. Many modifications and variations will now occur to persons skilled in the art. For a definition of the invention, reference is made to the appended claims.

What we claim is:

1. An apparatus for storing particulate food product in a refrigerated condition, then frying and dispensing portions of the product, comprising enclosed within a housing, a frying bath, a hopper for storage of said product and means for delivery of a portion of the food product from the hopper means to the frying bath,
    characterized by said hopper being enclosed in a refrigerated, insulated sub-housing,
    said hopper having a discharge opening through a bottom wall of said sub-housing,
    said hopper including impeller means disposed on an interior surface thereof adjacent said discharge opening for maintaining flow of said product through said discharge opening,
    a slider-receiving-member disposed immediately below said sub-housing with a substantially horizontal slideway defined therein having a bottom wall, opposed side walls and a top wall, said top wall having an opening therethrough below and in communication with said discharge opening, a slide member slidably received in the slideway for sliding therein between a fully retracted storage position and an extended dispensing position, said slide member having a vertical opening therethrough defining a portioning cavity therein, in said retracted position said portioning cavity disposed immediately below the opening in said top wall of the slider-receiving-member in communication therewith so as to receive product from the hopper, in the extended position, said vertical opening through the slider disposed entirely beyond the guideway to permit product in the opening to be dispensed vertically downwardly therefrom, when said slide member is in said retracted position, the portioning cavity is completely encircled by insulated wall portions of the slide member and/or the slider-receiving-member to thermally insulate the portioning cavity from the interior portions of the housing.

2. An apparatus as claimed in claim 1 wherein said bottom wall of said slider-receiving-member is insulated and cooling coils are disposed in said bottom wall to assist in maintaining portioning cavity in a cool, refrigerated condition.

3. An apparatus as claimed in claim 1 wherein said slide member has knife means disposed along an upper rearmost surface thereof to cut in a guillotine-like manner, during movement of the slide member from the retracted to the extended position, product which extends from the portioning cavity through the opening in the bottom wall of the slider-receiving-member.

4. An apparatus as claimed in claim 3 wherein said sub-housing is refrigerated by thermostatically controlled cooling coils disposed within said sub-housing.

5. An apparatus as claimed in claim 1 wherein said impeller means includes control means to operate said impeller means at predetermined intervals.

6. An apparatus for storing particulate food product in a refridgerated condition, then frying and dispensing portions of the product, comprising enclosed within a housing a frying bath, a hopper for storage of said product located above and to one side of the bath, said hopper being enclosed in a refrigerated, insulated sub-housing, said hopper having a discharge opening through a bottom wall of said sub-housing, said hopper including impeller means disposed on an interior surface thereof adjacent said discharge opening for rotating movement to maintain even flow of said product through said discharge opening, a frying basket movable between an upright position in the frying bath and an least partially inverted position outside the bath means for delivery of a portion of said product from the hopper into the frying basket when said frying basket is positioned intermediate the position in the frying bath and the partially inverted position, said means for delivery comprising, a slider-receiving member disposed immediately below said sub-housing with a substantially horizontal slideway defined therein having a bottom wall, opposed side walls and a top wall, said top wall having an opening therethrough below and in communication with said discharge opening, a slide member slidably received in the slideway for sliding therein between a retracted storage position and an extended dispensing position, the slide member having a vertical opening therethrough defining a portioning cavity therein, in said retracted position said portioning cavity disposed immediately below the opening in said top wall of the slider-receiving-member in communication therewith so as to receive product from the hopper, in the extended position, said vertical opening through the slider disposed entirely beyond the guideway to permit said product to be dispensed vertically downward therefrom into the basket, when the slide member is in said retracted position, the portioning cavity is completely encircled by insulated wall portions of the slide member or the slider-receiving-member to thermally insulate the portioning cavity from interior portions of the housing, means for effecting movement of the basket from its upright position to its at least partially invented position including means for effecting rotation of the basket about an axis in a direction to cause partial inversion of the basket after a predetermined frying time.

7. An apparatus as claimed in claim 6 wherein the partial inversion of the basket dispenses said product to an access cavity, said access cavity accessed through a sliding door which is lockable by a locking means, and including therein, means for dispensing condiments for use with said product.

8. An apparatus as claimed in claim 7 wherein said locking means is biased in a locked position and includes control means to overcome said bias and unlock said door for a predetermined interval of time.

9. An apparatus as claimed in claim 6 including air filtration means for substantially removing odours from air drawn from within said apparatus.

10. An apparatus as claimed in claim 9 wherein said air filtration means having at least one filter means therein for substantially removing odour causing molecules, particulate matter and dust from air drawn from within said apparatus.

11. An apparatus as claimed in claim 9 wherein said air filtration means includes duct means forming an air passage from an exterior of said apparatus to said filter means for substantially removing odour causing molecules, particulate matter and dust from air drawn from outside said apparatus.

12. An apparatus as claimed in claim 8 including air filtration means having at least one filter means therein for substantially removing odour causing molecules, particulate matter and dust from air drawn from within said apparatus.

13. An apparatus as claimed in claim 12 wherein said air filtration means includes duct means forming an air passage from an exterior of said apparatus to said filter means for substantially removing odour causing molecules, particulate matter and dust from air drawn from outside said apparatus.

* * * * *